US008733951B2

(12) United States Patent
Gruen et al.

(10) Patent No.: US 8,733,951 B2
(45) Date of Patent: May 27, 2014

(54) PROJECTED IMAGE ENHANCEMENT (75) Inventors: Robert Warren Gruen, Kirkland, WA (US); Daniel Richard Christen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 12/766,938

(22) Filed: Apr. 26, 2010

(65) Prior Publication Data
US 2011/0261260 A1 Oct. 27, 2011

(51) Int. Cl.
G03B 21/14 (2006.01)
G03B 21/26 (2006.01)
H04N 9/74 (2006.01)

(52) U.S. Cl.
USPC ................................ 353/97; 353/28; 348/586

(58) Field of Classification Search
USPC .................. 353/97, 28, 69, 70, 30, 121, 122; 348/586, 590, 607
See application file for complete search history.

(56) References Cited

U.S. PATENT DOCUMENTS

| 7,068,274 B2 | 6/2006 | Welch et al. |
| 7,133,083 B2 | 11/2006 | Jaynes et al. |
| 7,210,786 B2 * | 5/2007 | Tamura et al. .................. 353/28 |
| 7,300,155 B2 * | 11/2007 | Miyazawa et al. .............. 353/30 |
| 8,107,155 B2 * | 1/2012 | Bita et al. ...................... 359/290 |
| 2004/0165154 A1 * | 8/2004 | Kobori et al. ................... 353/69 |
| 2007/0019166 A1 * | 1/2007 | Iwasaki ........................... 353/34 |
| 2007/0167801 A1 | 7/2007 | Webler et al. |
| 2007/0195291 A1 * | 8/2007 | Tsumura ......................... 353/99 |
| 2009/0147224 A1 * | 6/2009 | Kurozuka et al. ............... 353/98 |
| 2009/0278958 A1 | 11/2009 | Bregman-Amitai et al. |

FOREIGN PATENT DOCUMENTS

WO WO 2007034875 A1 * 3/2007

OTHER PUBLICATIONS

Cham, et al., "Shadow Elimination and Occluder Light Suppression for Multi-Projector Displays", Retrieved at << http://www.cs.cmu.edu/~rahuls/pub/crltr-2002-03-rahuls.pdf >>, Technical Report Series, Mar. 2002, pp. 28.
Surati, Rajeev J., "Scalable Self-Calibrating Display Technology for Seamless Large-Scale Displays", Retrieved at << http://groups.csail.mit.edu/mac/users/raj/ScalableSeamless.pdf >>, Jan. 1999, pp. 1-67.
Audet, et al., "Shadow Removal in Front Projection Environments Using Object Tracking", Retrieved at << http://www.ok.ctrl.titech.ac.jp/~saudet/publications/procams2007.pdf >>, IEEE Conference on Computer Vision and Pattern Recognition, Jun. 17-22, 2007, pp. 8.

(Continued)

Primary Examiner — William C Dowling
Assistant Examiner — Ryan Howard
(74) Attorney, Agent, or Firm — Dan Choi; Carole Boelitz; Micky Minhas (57) ABSTRACT A first image is provided to a projector, which is configured to project the first image on a projection screen. A captured first image is received from a camera configured to capture the projected first image and an occluding object between the projector and the projection screen. A key including a difference between the captured first image and the first image is generated. A second image is modified according to the key to generate a new second image. The new second image is provided to the projector, which is further configured to project the new second image.

11 Claims, 6 Drawing Sheets

(56) References Cited

OTHER PUBLICATIONS

Sukthankar, et al., "Smarter Presentations: Exploiting Homography in Camera-Projector Systems", Retrieved at << http://www.cs.cmu.edu/~rahuls/pub/iccv2001-rahuls.pdf >>, Eighth International Conference on Computer Vision (ICCV'01), vol. 1, Jul. 7-14, 2001, pp. 7.

Hoffler, Alan., "Your Message and Other Things You Say", Retrieved at << http://www.millswyck.com/blog/index.php/category/presentation-skills/powerpoint/ >>, Retrieved Date: Feb. 18, 2010, pp. 8.

Rehg, et al., "Projected Light Displays Using Visual Feedback", Retrieved at << http://www.cs.cmu.edu/~rahuls/pub/icarcv2002-rahuls.pdf >>, Proceedings of the International Conference on Control, Automation, Robotics, and Vision, Dec. 2002, pp. 7.

* cited by examiner

PROJECTED IMAGE ENHANCEMENT

BACKGROUND

Projectors are designed to display content on a projection screen. For example, projectors are commonly used for giving presentations. A conventional projector may include a light source, an optical modulator, and a projector lens. The optical modulator may form an image by modulating a light beam emitted from the light source in accordance with given image information. The projection lens may then enlarge and project the image formed by the optical modulator.

When giving a presentation, a presenter may be positioned between the projector and the projection screen. For example, the presenter may stand near the projection screen and utilize a pointing device to direct an audience's attention to specific portions of the projected image. By standing between the projector and the projection screen, the presenter may occlude at least a portion of the projected image. The occlusion causes at least a portion of the image to be displayed on the presenter's face and body, which can be embarrassing to the presenter as well as distracting to the audience. Further, the bright light from the projector may blind, irritate, and/or distract the presenter.

It is with respect to these and other considerations that the disclosure made herein is presented.

SUMMARY

Technologies are described herein for enhancing a projected image. Through the utilization of the technologies and concepts presented herein, a camera is positioned to capture an image projected by a projector. A projected image enhancement system compares the captured image with the projected image. When no objects occlude the projection, the captured image and projected image should be the same or substantially the same. However, when an object occludes the projection, the captured image may be significantly different from the projected image.

The projected image enhancement system generates a key containing the difference between the captured image and the projected image. The key identifies pixels in the projected image that were occluded by one or more objects. The projected image enhancement system modifies a subsequent image according to the key to generate an enhanced subsequent image which is then projected. For example, the projected image enhancement system may blacken or otherwise modify the identified pixels in the enhanced subsequent image. In this way, when the projector projects the enhanced subsequent image, the enhanced subsequent image does not strike the object that is occluding the projected image. Even when the enhanced subsequent image does strike the object, the intensity by which the enhanced subsequent image strikes the object may be significantly reduced. By configuring the camera to capture a stream of images in real-time or near real-time as the projector displays the images, the projected image enhancement system can enhance a stream of subsequent images in real-time or near real-time.

According to some embodiments, technologies are provided for enhancing a projected image. The technologies provide a first image to a projector, which is configured to project the first image on a projection screen. The technologies receive an image from a camera configured to capture the projected first image and an occluding object between the projector and the projection screen. The technologies generate a key that includes a difference between the captured first image and the first image. The technologies modify a second image according to the key to generate a new second image. The technologies then provide the new second image to the projector, which is further configured to project the new second image.

It should also be appreciated that the above-described subject matter may also be implemented as a computer-controlled apparatus, a computer process, a computing system, or as an article of manufacture such as a computer-storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all of the disadvantages noted in any part of this disclosure.

DETAILED DESCRIPTION

The following detailed description is directed to technologies for enhancing a projected image, in accordance with some embodiments. While the subject matter described herein is presented in the general context of program modules that execute in conjunction with the execution of an operating system and application programs on a computer system, those skilled in the art will recognize that other implementations may be performed in combination with other types of program modules and/or in hardware. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
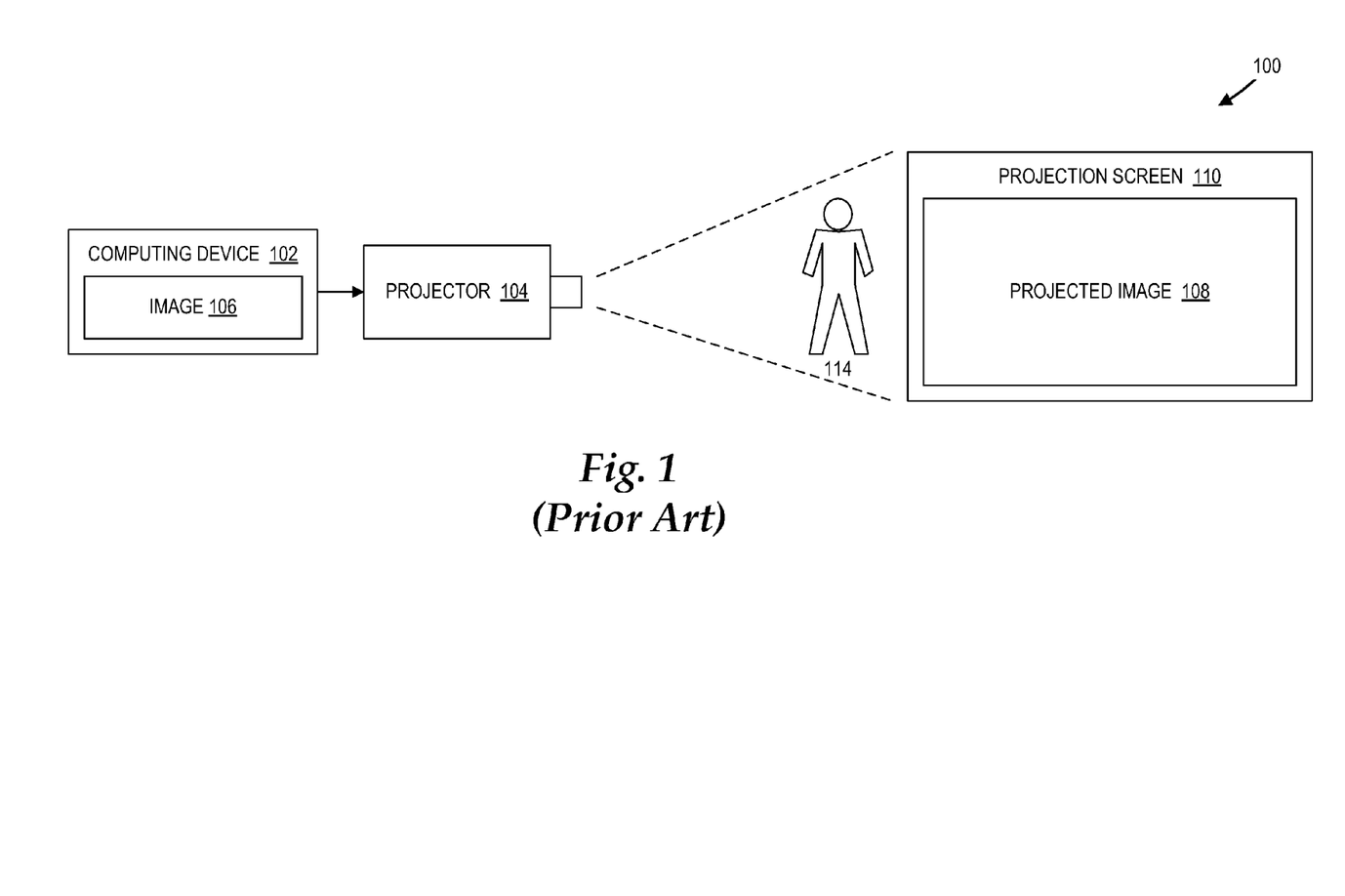
FIG. 1 is a diagram showing a conventional projector and projection screen arrangement during a presentation.

In the following detailed description, references are made to the accompanying drawings that form a part hereof, and which are shown by way of illustration, specific embodiments, or examples. Referring now to the drawings, in which like numerals represent like elements through the several figures, a computing system and methodology for enhancing a projected image will be described. In particular, FIG. 1 illustrates a conventional presentation setup 100 including a computing device 102 coupled to a projector 104. The computing device 102 may send an image 106 to the projector 104, which projects the image 106 on a projection screen 110. The projection screen 110 displays a projected image 108 corresponding to the image 106.

When no object is present between the projector 104 and the projection screen 110, the projected image 108 matches or substantially matches the image 106. For example, minor defects in the projector 104 and/or the projection screen 110 may cause insignificant differences between the image 106 and the projected image 108. However, when a presenter 114 or other suitable object is positioned between the projector 104 and the projection screen 110, a portion of the projected image 108 may not be displayed on the projection screen 110. In particular, this portion of the projected image 108 may be displayed on the presenter 114, which can be embarrassing to the presenter 114 and distracting to an audience. For example, an odd shape may be displayed on the forehead of the presenter 114. Further, the bright light projected by the projector 104 may blind, irritate, and/or distract the presenter 114.

Figure 2A:
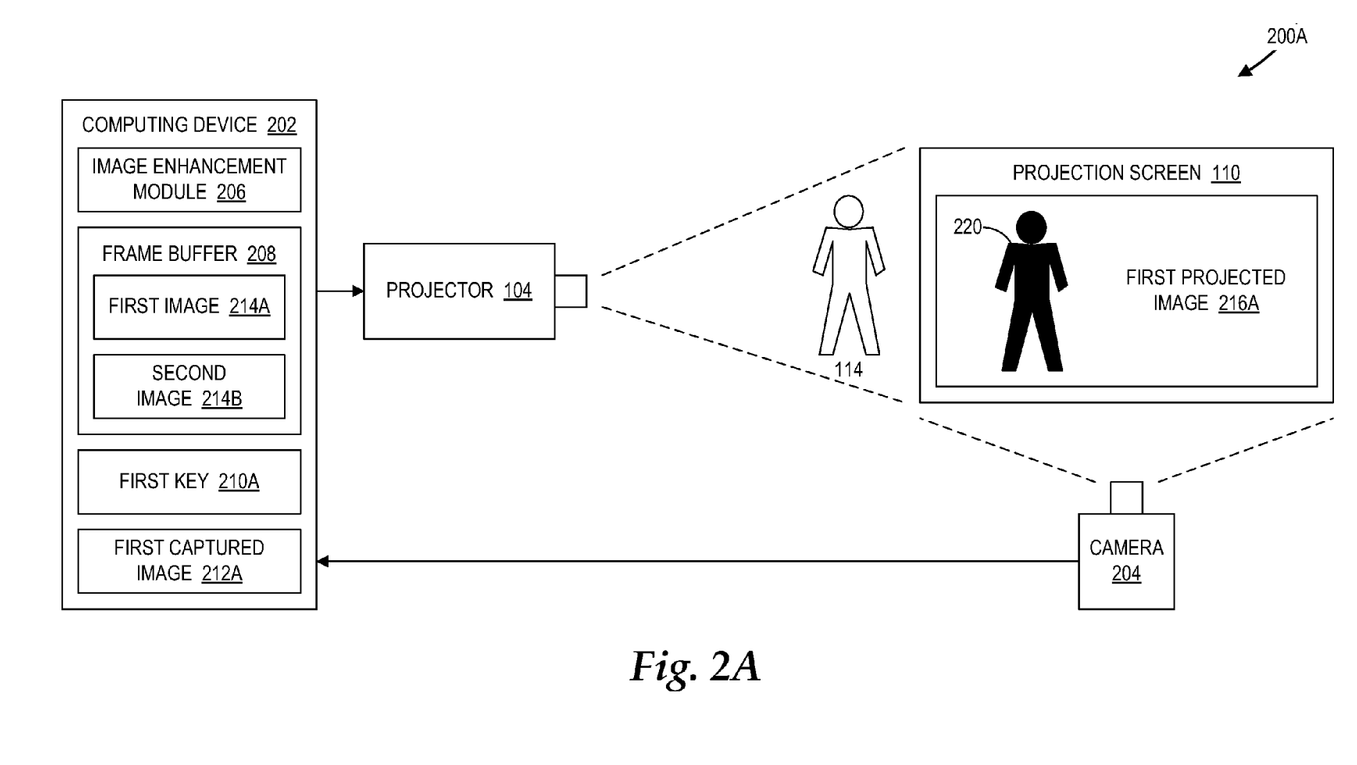
FIGS. 2A and 2B are diagrams showing a projector presentation system adapted to generate and project enhanced images, in accordance with some embodiments.
Figure 2B:
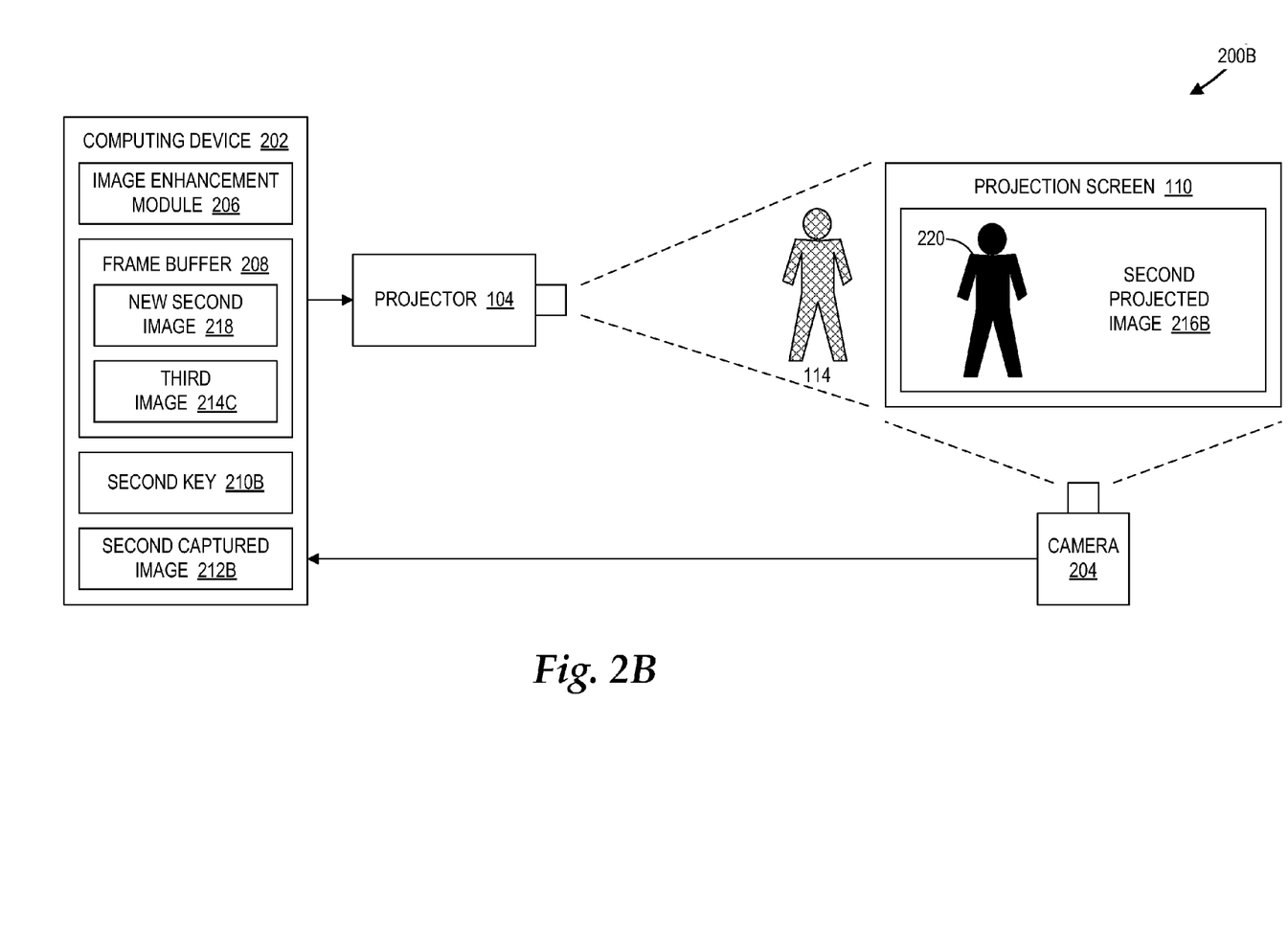

Turning now to FIGS. 2A and 2B, presentation setups 200A, 200B configured to enhance a projected image are shown. In FIG. 2A, the presentation setup 200A includes a computing device 202 coupled to the projector 104 and a camera 204. The computing device 202 contains an image enhancement module 206, a frame buffer 208, a first key 210A, and a first captured image 212A. The frame buffer 208 includes a first image 214A and a second image 214B. The frame buffer 208 may be configured to provide a stream of images, including the first image 214A and the second image 214B, to the projector 104. The first image 214A and the second image 214B may be the same or different images.

The projector 104 receives the first image 214A from the frame buffer 208 and projects the first image 214A on the projection screen 110. The projection screen 110 displays a first projected image 216A corresponding to a projection of the first image 214A. As used herein, a "projected image" refers to the resulting image displayed on the projection screen 110 as a result of projecting a given image. Thus, the first projected image 216A refers to the resulting image displayed on the projection screen 110 as a result of projecting the first image 214A.

The presenter 114 is positioned between the projector 104 and the projection screen 110, thereby occluding a portion of the projection of the first image 214A. As a result, the first projected image 216A contains a shadow 220 of the presenter 114. The camera 204 is arranged and configured to capture, in the first captured image 212A, the first projected image 216A as displayed on the projection screen 110. In one embodiment, the captured image 212A contains only the projected image as displayed on the projection screen 110. In this case, the captured image 212A may not include any objects, such as the presenter 114, between the projector 104 and the projection screen 110. In another embodiment, the captured image 212A contains the projected image displayed on the projection screen 110 as well as any occluding objects (i.e., the presenter 114) between the projector 104 and the projection screen 110. The camera 204 provides the first captured image 212A to the computing device 202.

Upon receiving the first captured image 212A, the image enhancement module 112 may perform edge detection or other suitable image processing techniques in order to align the first captured image 212A with the first image 214A. The image enhancement module 206 then compares the first captured image 212A with the first image 214A and generates the first key 210A containing the difference between the first captured image 212A and the first image 214A. Thus, the first key 210A identifies pixels corresponding to the portion of the first projected image 108 that is occluded by the presenter 114. The image enhancement module 206 may perform image processing on the first key 210A, such as filtering, smoothing, and/or quantization. The image enhancement module 206 may then modify the pixels identified by the first key 210A on a subsequent image, such as the second image 214B.

In FIG. 2B, the frame buffer 208 includes a new second image 218 and a third image 214C. The new second image 218 replaces the second image 214B in the frame buffer 208. The image enhancement module 206 generates the new second image 218 by modifying the pixels identified by the first key 210A on the second image 214B. In one embodiment, the image enhancement module 206 changes the identified pixels in the second image 214B to black, gray, or other suitable color. In another embodiment, the image enhancement module 206 forms a suitable pattern, such as a stippled pattern, on the identified pixels in the second image 214B. In yet another embodiment, the image enhancement module 206 does not alter the pixels in the second image 214B but rather reduces the brightness of the identified pixels. The image enhancement module 206 may also apply hysteresis on the new second image 214B to prevent flickering at edges of modified pixels, thereby providing a smooth transition between the modified pixels and the surrounding image.

Upon generating the new second image 218, the image enhancement module 112 sends the new second image 218 to the projector 104. The projector 104 projects the new second image 218 on the projection screen 110, which displays a second projected image 216B corresponding to the new second image 218. Although the presenter 114 is positioned between the projector 104 and the projection screen 110, the second projected image 216B may not strike the presenter 114 because of the modified pixels. For example, if the intensity or brightness of the pixels identified by the first key 210A has been reduced on the new second image 218, then the projector 104 will project less light for those corresponding pixels. The cross-hatching of the presenter 114 as illustrated in FIG. 2B indicates that the second projected image 216B does not strike the presenter 114. Even when the second projected image 216B does strike the presenter 114, the intensity by which the second projected image 216B strikes the object may be significantly reduced. In one example, the image enhancement module 206 may remove odd shapes from the second image 214B that would have struck the presenter 114. In another example, the image enhancement module 206 may reduce the brightness of the portion of the second image 214B that would have blinded the presenter 114.

The camera 204 may be configured to capture, in a second captured image 212B, the second projected image 216B as displayed on the projection screen 110. Thus, as the presenter 114 moves, the image enhancement module 206 can continue to create new keys, such as a second key 210B, and adjust subsequent images, such as the third image 214C, in the frame buffer 208. It should be appreciated that the image enhancement module 206 may analyze only a subset of images contained in the frame buffer 208. In particular, the image enhancement module 206 may be configured to analyze the images in the frame buffer 208 at any suitable rate, such as real-time (i.e., as each image is projected), one image per unit of time, etc.

As illustrated in FIGS. 2A and 2B, the camera 204 is separate from the projector 104. In other embodiments, the camera 204 is integrated with the projector 104. For example, the camera 204 and the projector 104 may be contained in the same housing. The camera 204 and the projector 104 may even share some circuitry, thereby reducing lag between projecting an image and enhancing a subsequent image. When the camera 204 is integrated with the projector 104, the captured image captured by the camera 204 may include the projected image as well as the occluding objects between the projector 104 and the projection screen 110. Suitable image processing techniques may be utilized to identify the occluding objects within the captured image when comparing the captured image with the image that is projected by the projector 104.

If the camera 204 is separate from the projector 104, the image enhancement module 206 may perform an initial calibration process that aligns a test image projected by the projector 104 with a corresponding image captured by the camera 204. For example, during the calibration process, the image enhancement module 206 may cause the projector 104 to project a test pattern on the projection screen 110. The test pattern may include a border identifying a surface area to be captured by the camera 204. The camera 204 may then capture an image of the test pattern as displayed on the projection screen 110. A user can adjust the position of the camera 204 such that the captured image properly includes the projected test pattern.

In one embodiment, the camera 204 is implemented as a webcam (e.g., a standard RGB webcam). In another embodiment, the camera 204 is implemented as a three-dimensional camera with an infrared light source. In this case, the infrared light source emits pulses of infrared light against objects, such as the presenter 114 and the projection screen 110, which reflect the infrared light. The three-dimensional camera, which may include a monochrome complementary metal-oxide-semiconductor ("CMOS") sensor, then senses the reflected infrared light and determines depth of the objects based on a delay in which the three-dimensional camera senses the reflected infrared light. In particular, objects that are farther away may exhibit a greater delay than objects that are closer to the three-dimensional camera. In this way, the image enhancement module 206 can identify any occluding objects between the projector 104 and the projection screen 110.

If the distance between the camera 204 and the projector 104 is known, then the three-dimensional camera and the infrared light source can be utilized alone. In particular, the image enhancement module 206 may utilize ray tracing techniques to create a three-dimensional image identifying objects, such as the presenter 114, that occlude the projection screen 110. By aligning the three-dimensional image with a webcam image, the three-dimensional camera and the infrared light source can also be utilized in conjunction with the webcam in order to verify the position of occluding objects. The distance between the camera 204 and the projector 104 may be determined when the camera 204 and the projector 104 are calibrated or after the first image is projected from the projector 104. In other embodiments, the three-dimensional camera and the infrared light source may be utilized alone without knowing the distance between the camera 204 and the projector 104.

In the embodiments described above, the image enhancement module 206 applies a key, such as the keys 210A, 210B, on an original image in the frame buffer 208 in order to create a new image. The projector 104 then projects the new image in place of the original image. In other embodiments, the key may be utilized to disable specific pixels projected by the projector 104. In this way, the projector 104 can still project the original image, but because specific pixels are disabled, the projector 104 projects only a portion of the original image.

In one example, the projector 104 may be a light emitting diode ("LED") projector containing LEDs corresponding to a plurality of pixels. The image enhancement module 206 may be configured to disable one or more LEDs corresponding to pixels identified by the key. In this way, when the LED projector projects the original image, the LED projector effectively blackens the pixels by not projecting anything identified by the key. In another example, the projector 104 includes a mechanism (not shown), such as a shaped electrochromic filter, in the projector lens adapted to prevent the key area from being projected past the projector 104.

Figure 3A:
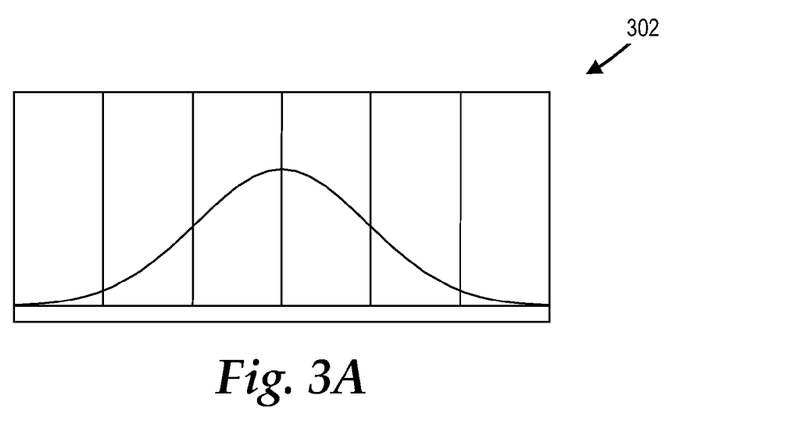
FIGS. 3A-3B are diagrams of illustrative images showing an operation of the projector presentation system, in accordance with some embodiments.
Figure 3B:
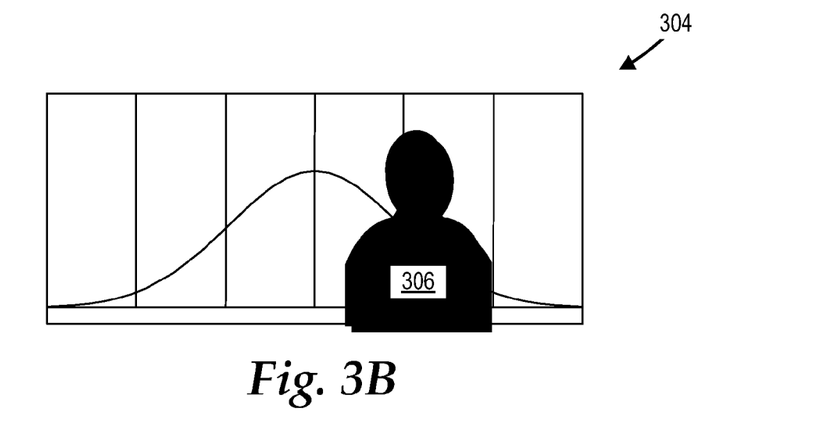

Turning now to FIGS. 3A-3B, an illustrative operation of the image enhancement module 206 is shown. In particular, FIG. 3A shows an original image 302 that may be included in the frame buffer 208. FIG. 3B shows a new image 304. The image enhancement module 206 creates the new image 304 by modifying the original image 302 according to a key, such as the keys 210A, 210B. The key may identify pixels in the original image 302 that are occluded by the presenter 114 or other object when the original image 302 is projected on the projection screen 110. As illustrated in FIG. 3B, the image enhancement module 206 blackens the pixels identified by the key. A silhouette 306 of the presenter 114 represents the blackened pixels on the new image 304. In this case, when the projector 104 projects the new image 304, the projector 104 does not project light in the area of the silhouette 306 because the corresponding pixels have been blackened.

Figure 4:
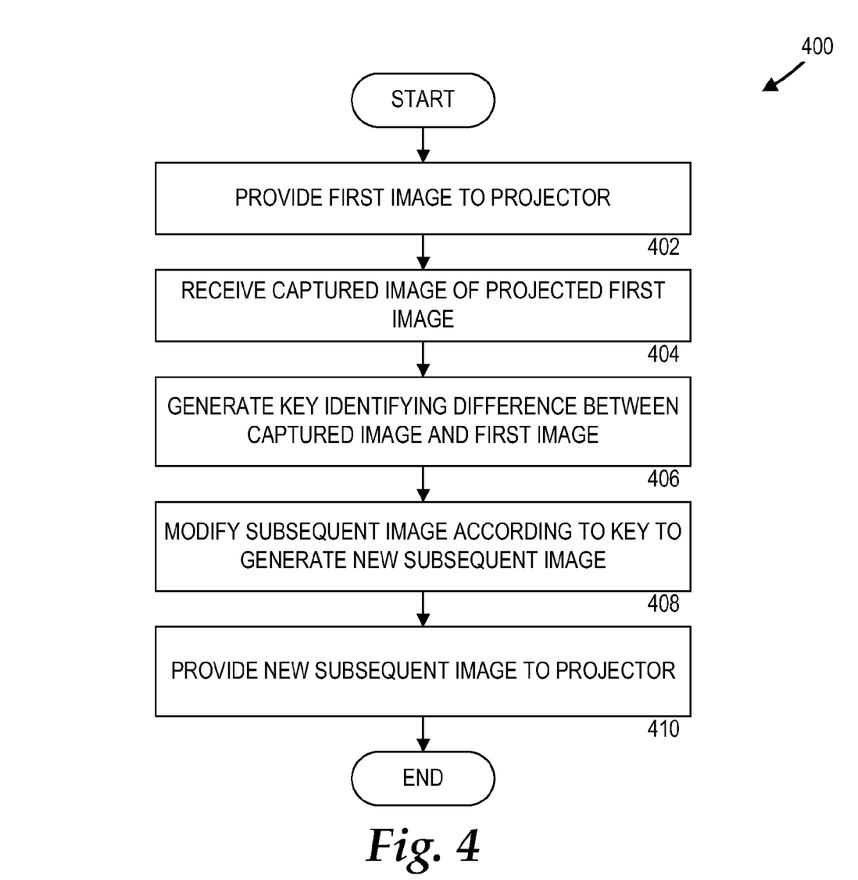
FIG. 4 is a flow diagram illustrating a method for enhancing a projected image, in accordance with some embodiments.

Referring now to FIG. 4, a flow diagram illustrates a method for enhancing a projected image. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein. Further, one or more of these operations may repeat as necessary.

In FIG. 4, a routine 400 begins at operation 402, where the image enhancement module 206 provides a first image, such as the first image 214A, to the projector 104. The projector 104 may be configured to project the first image on the projection screen 110. When the projector 104 receives the first image and projects the first image on the projection screen 110, the routine 400 proceeds to operation 404, where the image enhancement module 206 receives a captured image, such as the first captured image 212A, from the camera 204. In particular, the camera 204 may capture, in the captured image, the projected first image as displayed on the projection screen 110. In one embodiment, the captured image does not include any objects, such as the presenter 114, positioned between the projector 104 and the projection screen 110. In another embodiment, the captured image includes occluding objects positioned between the projector 104 and the projection screen 110. The camera 204 then provides the captured image to the image enhancement module 206.

When the image enhancement module 206 receives the captured image, the routine 400 proceeds to operation 406, where the image enhancement module 206 generates a key, such as the keys 210A, 210B, by comparing the captured image with the first image. The key may identify the difference between the captured image and the first image. In particular, the key may identify pixels on the projected first image that were occluded by an object. When the image enhancement module 206 generates the key, the routine 400 proceeds to operation 408. At operation 408, the image enhancement module 206 modifies a subsequent image, such as the second image 214B, in the frame buffer 208 in order to generate a new subsequent image, such as the new second image 218. In particular, the image enhancement module 206 transforms the subsequent image to the new subsequent image according to the key. In one embodiment, the image enhancement module 112 changes the identified pixels in the subsequent image to black, gray, or other suitable color. In another embodiment, the image enhancement module 112 forms a suitable pattern on the identified pixels in the second image 214B. In yet another embodiment, the image enhancement module 112 reduces the brightness of the identified pixels in the second image 214B.

When the image enhancement module 206 generates the new subsequent image, the routine 400 proceeds to operation 410, where the image enhancement module 206 provides the new subsequent image to the projector 104. The projector 104 may be further configured to project the new subsequent image. When the projector 104 receives the new subsequent image, the projector 104 projects the new subsequent image on the projection screen 110. When the projector projects the new subsequent image, the new subsequent image may not strike the object. Even when the new subsequent image does strike the object, the intensity by which the new subsequent image strikes the object may be significantly reduced.

Figure 5:
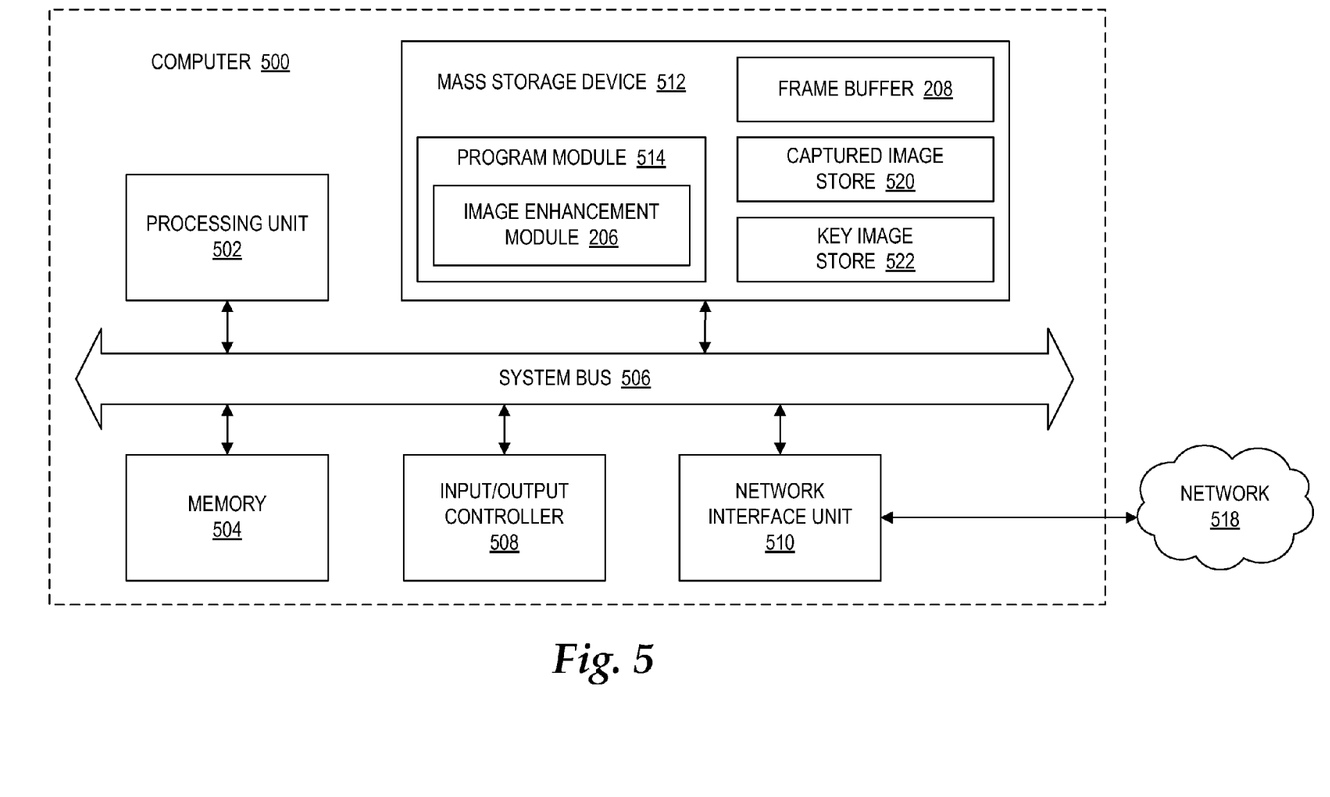
FIG. 5 is a computer architecture diagram showing an illustrative computer hardware architecture for a computing system capable of implementing the embodiments presented herein.

Turning now to FIG. 5, an example computer architecture diagram showing a computer 500 is illustrated. An example of the computer 500 may include the computing device 202 illustrated in FIGS. 2A-2B. The computer 500 may include a processing unit 502 ("CPU"), a system memory 504, and a system bus 506 that couples the memory 504 to the CPU 502. The computer 500 may further include a mass storage device 512 for storing one or more program modules 514, the frame buffer 208, a captured image store 520, and a key image store 522. Examples of the program modules 514 may include the image enhancement module 206. The captured image store 520 may be configured to store captured images, such as the captured images 212A, 212B. The key image store 522 may be configured to store keys, such as the keys 210A, 210B. The mass storage device 512 may be connected to the CPU 502 through a mass storage controller (not shown) connected to the bus 506. The mass storage device 512 and its associated computer-storage media may provide non-volatile storage for the computer 500. Although the description of computer-storage media contained herein refers to a mass storage device, such as a hard disk or CD-ROM drive, it should be appreciated by those skilled in the art that computer-storage media can be any available computer storage media that can be accessed by the computer 500.

By way of example, and not limitation, computer-storage media may include volatile and non-volatile, removable and non-removable media implemented in any method or technology for storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 518. The computer 500 may connect to the network 518 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

The bus 506 may enable the processing unit 502 to read code and/or data to/from the mass storage device 512 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 514 may include software instructions that, when loaded into the processing unit 502 and executed, cause the computer 500 to enhance a projected image. The program modules 514 may also provide various tools or techniques by which the computer 500 may participate within the overall systems or operating environments using the components, flows, and data structures discussed throughout this description. For example, the program modules 514 may implement interfaces for enhancing a projected image.

In general, the program modules 514 may, when loaded into the processing unit 502 and executed, transform the processing unit 502 and the overall computer 500 from a general-purpose computing system into a special-purpose computing system customized to enhance a projected image. The processing unit 502 may be constructed from any number of transistors or other discrete circuit elements, which may individually or collectively assume any number of states. More specifically, the processing unit 502 may operate as a finite-state machine, in response to executable instructions contained within the program modules 514. These computer-executable instructions may transform the processing unit 502 by specifying how the processing unit 502 transitions between states, thereby transforming the transistors or other discrete hardware elements constituting the processing unit 502.

Encoding the program modules 514 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for enhancing a projected image are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for enhancing a projected image, the method comprising computer-implemented operations for:
    emitting pulses of infrared light against an occluding object between a projector and a projection screen;
    sensing the infrared light reflected by the occluding object between the projector and the projection screen using an infrared sensing three-dimensional camera comprising a monochrome complementary metal-oxide-semiconductor (CMOS) sensor;
    determining, by a computing device, a depth of the occluding object and the projection screen based on a delay of the sensed infrared light reflected by the occluding object and the projection screen;
    generating, by the computing device, a key based on determining the depth of the occluding object and the projection screen, wherein the key identifies pixels of the image that were occluded by the occluding object;
    modifying, by the computing device, an image according to the key to generate a new image; and
    providing, by the computing device, the new image to the projector, the projector further configured to project the new image.

2. The computer-implemented method of claim 1, wherein modifying the image according to the key to generate the new image comprises blackening the identified pixels in the image to generate the new image.

3. The computer-implemented method of claim 1, wherein modifying the image according to the key to generate a new image comprises changing colors of the identified pixels in the image to a non-black color to generate the new image.

4. The computer-implemented method of claim 1, wherein modifying the image according to the key to generate the new image comprises forming a pattern on the identified pixels in the image to generate the new image.

5. The computer-implemented method of claim 1, wherein modifying the image according to the key to generate the new image comprises reducing a brightness of the identified pixels in the image to generate the new image.

6. The computer-implemented method of claim 1, further comprising performing at least one of filtering, smoothing, and quantization on the key.

7. The computer-implemented method of claim 1, further comprising applying hysteresis on the new image.

8. A projection system comprising:
    a projector;
    an infrared sensing three-dimensional camera comprising a monochrome complementary metal-oxide-semiconductor (CMOS) sensor;
    an infrared light source configured to emit pulses of infrared light against an occluding object between the projector and a projection screen;
    a processor;
    a memory communicatively coupled to the processor; and
    an image enhancement module (i) which executes in the processor from the memory and (ii) which, when executed by the processor, causes the projection system to enhance a projected image by
        sensing the infrared light reflected by an occluding object between the projector and the projection screen,
        determining a depth of the occluding object and the projection screen based on a delay of the sensed infrared light reflected by the occluding object and the projection screen,
        generating a key based on determining the depth of the occluding object and the projection screen,
        modifying an image according to the key to generate a new image,
        providing the new image to the projector, the projector further configured to project the new image, and
        causing the projection system to enhance the new image by aligning the camera and the projector through a calibration process.

9. The projection system of claim 8, wherein the camera and the projector are contained in a single housing.

10. The projection system of claim 8, wherein the camera and the projector are contained in separate housings.

11. One of an optical storage disk, a magnetic storage device, or a solid-state storage device having computer executable instructions stored thereon which, when executed by a computer, cause the computer to:
    emit pulses of infrared light against an occluding object between a projector and a projection screen;
    sense the infrared light reflected by the occluding object between the projector and the projector screen using an infrared sensing three-dimensional camera comprising a monochrome complementary metal-oxide-semiconductor (CMOS) sensor;
    determine a depth of the occluding object and the projection screen based on a delay of the sensed infrared light reflected by the occluding object and the projection screen;
    generate a key based on determining the depth of the occluding object and the projection screen, the key identifying pixels of a projected image that were occluded by the occluding object;

modifying the identified pixels according to the key to generate a new image;

providing the new image to the projector, the projector further configured to project the new image; and causing the projector to enhance the new image by aligning the camera and the projector through a calibration process.

* * * * *